US00RE42633E

(19) United States
(12) Reissued Patent
Gleasman et al.

(10) Patent Number: US RE42,633 E
(45) Date of Reissued Patent: Aug. 23, 2011

(54) SPOOL VALVE FOR FLUID CONTROL

(75) Inventors: Vernon E. Gleasman, Pittsford, NY (US); Warren R. Alexander, Pittsford, NY (US)

(73) Assignee: Torvec, Inc., Rochester, NY (US)

(21) Appl. No.: 10/941,012

(22) Filed: Sep. 14, 2004

Related U.S. Patent Documents

Reissue of:
(64) Patent No.: 6,095,192
Issued: Aug. 1, 2000
Appl. No.: 09/238,444
Filed: Jan. 28, 1999

(51) Int. Cl.
*F16K 11/14* (2006.01)
*F16K 3/24* (2006.01)

(52) U.S. Cl. ..... 137/624.18; 137/625.37; 137/625.38; 137/625.48; 137/625.67; 137/625.68; 251/251; 251/325; 91/480

(58) Field of Classification Search ..... 137/624.18, 137/625.37, 625.38, 625.48, 625.67, 625.68; 91/480; 251/251, 325
See application file for complete search history.

(56) References Cited

U.S. PATENT DOCUMENTS

| | | | | |
|---|---|---|---|---|
| 2,550,011 | A | 4/1951 | Kohler et al. | 137/867 |
| 3,092,085 | A | 6/1963 | Bataille | 91/481 |
| 3,406,705 | A | 10/1968 | Meyer | |
| 4,748,898 | A | 6/1988 | Hayashi et al. | 92/12.2 |
| 4,916,901 | A | 4/1990 | Hayashi et al. | 60/489 |
| RE33,455 | E | 11/1990 | Hayashi et al. | 92/57 |
| 5,038,634 | A | 8/1991 | Matsuto et al. | 74/730.1 |
| 5,094,147 | A | 3/1992 | Shaw | 91/499 |
| 5,109,754 | A | 5/1992 | Shaw | 91/499 |
| 5,248,126 | A | 9/1993 | Pruess | |
| 5,513,553 | A | 5/1996 | Gleasman et al. | 92/12.2 |
| 5,554,009 | A | 9/1996 | Ohta et al. | 417/269 |

FOREIGN PATENT DOCUMENTS

| | | | |
|---|---|---|---|
| CN | 87216330 | U | 11/1988 |
| CN | 2240651 | Y | 11/1996 |
| CN | 1163650 | A | 10/1997 |
| DE | 4108014 | A1 | 9/1992 |
| JP | 49-68867 | | 7/1974 |
| JP | 58-111476 | U | 7/1983 |
| JP | 06-346974 | A | 12/1994 |

OTHER PUBLICATIONS

Abstract of Japanese Publication No. 04-191577 published Jul. 9, 1992.*
Abstract of Japanese Publication No. 09-303579 published Nov. 25, 1997.*
Abstract of Japanese Publication No. 07-119860 published May 12, 1995.*

* cited by examiner

*Primary Examiner* — Kevin L Lee
(74) *Attorney, Agent, or Firm* — Buchanan Ingersoll & Rooney P.C.

(57) ABSTRACT

A spool valve is provided with a stem portion that defines a fluid passageway formed by either (a) a single central support having a non-cylindrical curved surface shaped hydrodynamically, or (b) only a pair of sidewalls with, preferably, interior surfaces that are also shaped hydrodynamically. These stem passageways, which are designed to facilitate the flow of high-speed/high-pressure fluids controlled by the valve, are maintained in a predetermined orientation relative to the ports of the valve cylinders by a mechanism preferably including (a) a cam-following roller supported in a tang fixed to each spool and (b) a two-element cam that captures the roller within two of the parallel sides of a cam-track groove formed on the respective interior surfaces of each cam element.

17 Claims, 9 Drawing Sheets

SPOOL VALVE FOR FLUID CONTROL

Figure 1:
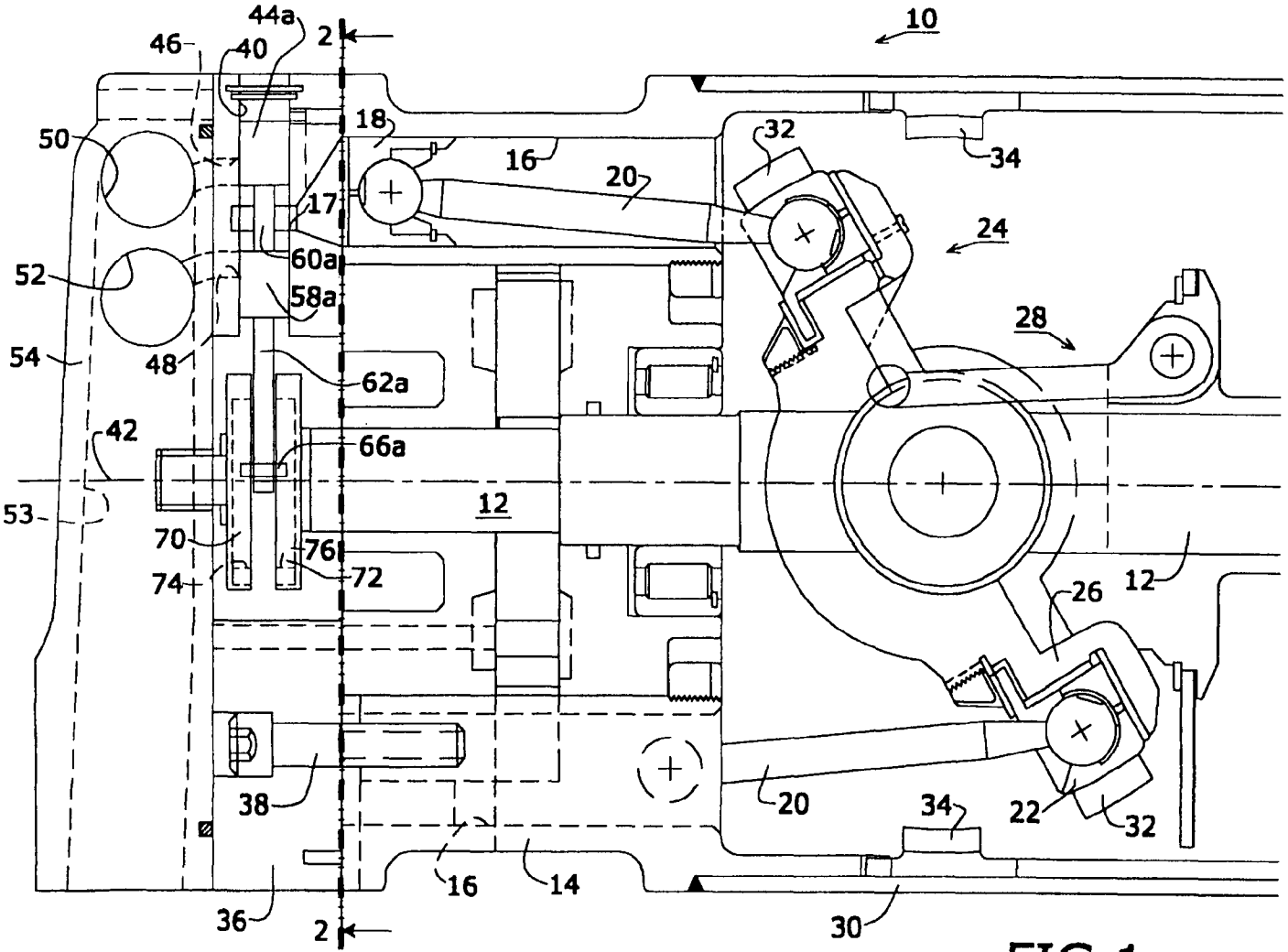

Matter enclosed in heavy brackets [ ] appears in the original patent but forms no part of this reissue specification; matter printed in italics indicates the additions made by reissue.

TECHNICAL FIELD

This invention relates to valving used to control the flow of fluids, e.g., radial valves incorporated as an integral part of hydraulic pump/motors; and, more particularly, it relates to apparatus for controlling the operation of spools used in such valves and to the shape of the spools themselves.

BACKGROUND

Valving using reciprocating spools to control the flow of fluids is well known in the hydraulics art. For instance, spool valves, arranged radially, are used as part of hydraulic pump/motor apparatus (e.g., see U.S. Pat. No. 5,513,553 entitled "Hydraulic Machine with Gear-Mounted Swash-Plate"). In most such known valving, each spool reciprocates axially within a cylinder formed in the valve body. Most commonly, each cylinder is provided with a pair of ports defining first and second fluid passages, and the spool has a pair of port-blocking portions separated by a stem so that, when the spool is moved axially to a first position, the first fluid passage is blocked while fluids are permitted to move past the stem and through the second fluid passage. Likewise, when the spool is moved axially to a second position, the second fluid passage is blocked while fluids are permitted to move past the stem and through the first fluid passage.

Traditionally in such valving, one end of the spool portion of the valve acts as a cam follower that rides on a revolving cam surface, and each spool is spring biased toward the cam surface so rotation of the cam controls the successive and continuous axial movement of the respective spools in each valve set. However, it is known that the response time and general operation of such spring-biased spool systems are often affected by dirt and counter-pressure problems. Also, it is well known that the individual spools of such known valving often rotate (albeit, very slowly) about their central axes when being operated within their respective cylinders. Therefore, the narrowed stem section of each spool has preferably been designed with a cylindrical shape (see FIGS. 3 and 4) so that, should such spool rotation occur, changes in the orientation of its stem section do not result in any change in the shape of the fluid passageway formed about the cylindrical stem section when the valve is opened.

Valve design is of particular importance when the valving is used to control the flow of hydraulic fluids under high speed and high pressure conditions, e.g., in automotive pump/motors which are capable of developing high horsepower and must be able to achieve speeds as high as 4000 rpm and to withstand pressures as high as 4000 p.s.i. Consistent fluid flow under such conditions is critical.

The invention disclosed herein is primarily directed to such critical fluid flow. Valving according to the invention overcomes the response time problems of spring-biased valving and not only assures consistency of valve timing but also significantly increases the efficiency of fluid flow past the stem portion of each spool.

SUMMARY OF THE INVENTION

The general format of valving according to this invention follows the known conventional spool valve arrangements discussed above. Namely, each spool reciprocates axially within a cavity, preferably a cylinder, formed in the valve body. The cylinder may include ports forming only a single fluid passage. However, in the embodiments designed for use with hydraulic pump/motors (e.g., as disclosed in FIGS. 1 and 2), each cylinder is provided with first and second ports defining first and second fluid passages. The spool has a pair of port-blocking portions separated by a stem so that, when the spool is moved axially to a first position, the first fluid passage is blocked while fluids are permitted to move past the stem and through the second fluid passage; and, when the spool is moved axially to a second position, the second fluid passage is blocked while fluids are permitted to move past the stem and through the first fluid passage.

However, in contrast to prior art arrangements, in the invention's valving, reciprocating axial motion of each spool is not controlled by a spring-biased cam follower. Instead, positive spool control is achieved with a cam follower captured within a cam track that is fixed to rotate with a drive shaft. The cam track has at least two parallel cam surfaces between which the cam follower is captured. In all preferred embodiments, the cam follower is a roller.

Figure 2:
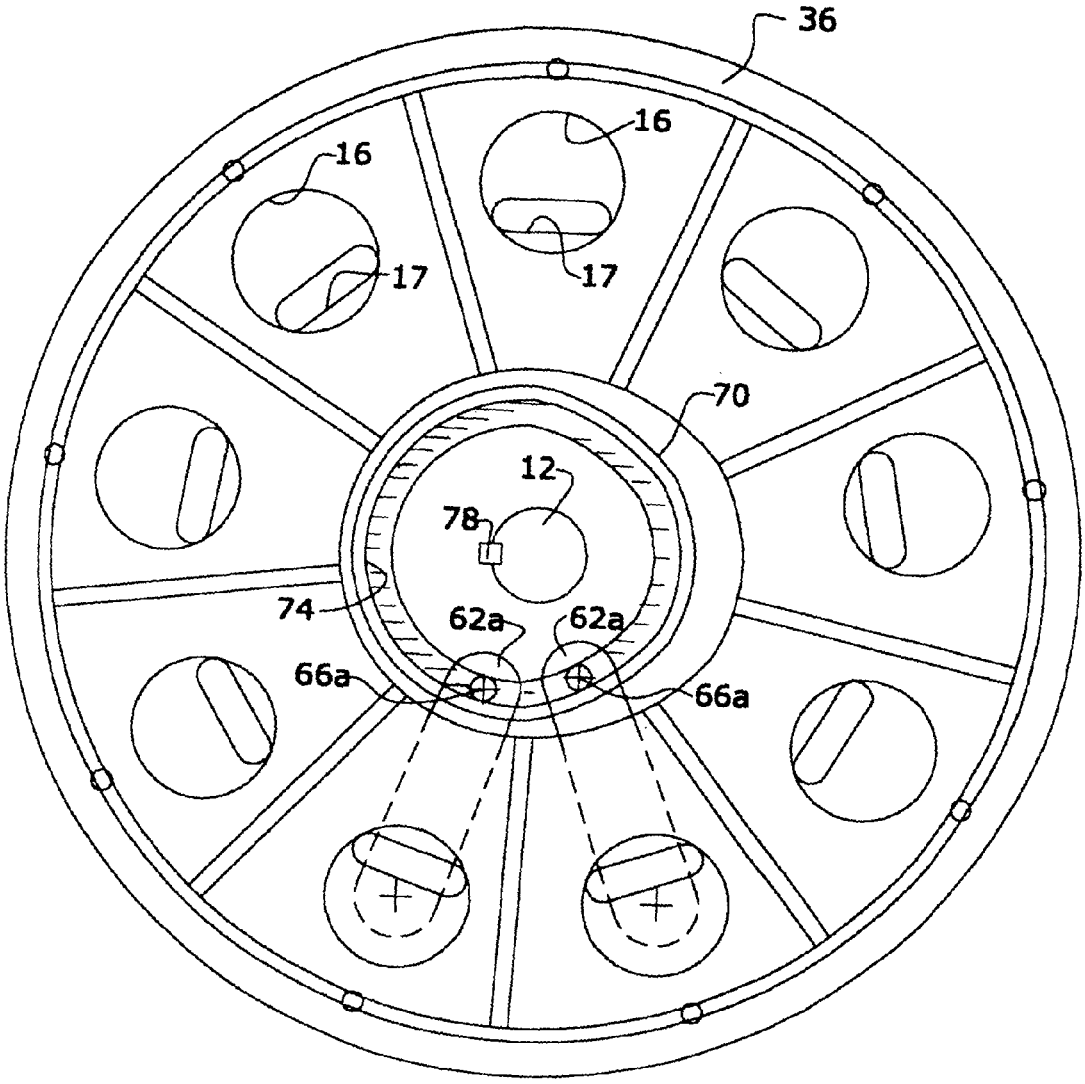

In the preferred valving arrangement illustrated in FIGS. 1 and 2, a plurality of individual valves are arranged radially about the drive shaft of a hydraulic pump/motor. The spool within each valve includes a tang that extends from the bottom of the spool. The tang is provided with a hole through which a cam-following roller is received and supported in a predetermined orientation that permits rolling engagement of the roller with the parallel surfaces of the cam track. In the disclosed embodiment, the parallel surfaces of the cam track are divided into two mirror-image portions that provide a balanced positive drive for controlling the position of the cam-following rollers. The combination of the cam track, roller, and tang controls the timing of the reciprocation of each spool and, simultaneously, also serves as an orientation mechanism that prevents rotation of the spool about its central [axial] *axis* within its respective cylinder.

The stem portion of each spool defines a passageway *preferably* formed by [either (a) a single, central support which, when viewed in a cross section taken perpendicular to the central axis of the spool, has a non-circular curved surface shaped hydrodynamically, or (b) only] a pair of sidewalls. Preferably, the interior surfaces of the sidewalls are [also] shaped hydrodynamically. The respective hydrodynamic shapes of the central supports and the sidewalls are designed to facilitate the high-speed/high-pressure flow of fluids through the fluid passages controlled by the valve. That is, these hydrodynamic surfaces are shaped to facilitate both (i) the flow of fluids through the spool and (ii) the direction of fluid flow to and from the fluid passageways defined by the respective cylinder ports when said stem portion is aligned therewith.

Of course, these hydrodynamic stem surfaces must be maintained in a predetermined orientation relative to the ports of the valve cylinders in order to assure maximum flow of fluid through these stem and cylinder passageways. The invention's orientation mechanism prevents any axial rotation of the spools. Namely, this mechanism includes the cam followers that are mounted on each spool. As just mentioned above, these cam followers (preferably, rollers) are captured between the parallel surfaces of a rotating cam so that each spool, while being positively driven by the cam track, cannot rotate about its axis, thereby maintaining the desired orientation of the spool's stem passageway.

DRAWINGS

FIG. 1 is a schematic cross-sectional view (with minor parts and cross-hatching omitted to enhance clarity) of selected portions of a hydraulic pump/motor machine (e.g., of the type disclosed in U.S. Pat. No. 5,513,553), showing the invention's improved radial spool valving positioned within the left end of the housing.

FIG. 2 is a similarly schematic cross-sectional view of the radial spool valve portion of FIG. 1, taken along the plane 2-2 (with parts removed) representing (a) the machine's nine pump cylinders and respective valve openings, (b) one-half of the invention's positive cam track, and (c) only the tang and roller portions of two spools.

Figure 5:
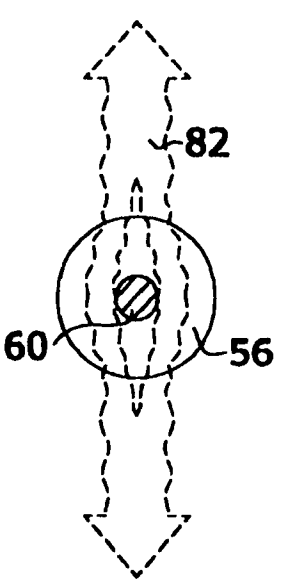
FIG.5 PRIOR ART
Figure 4:
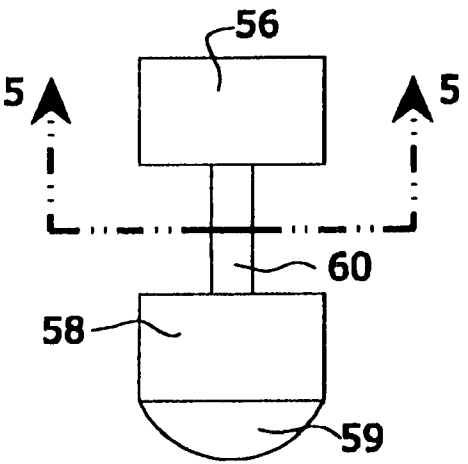
FIG.4 PRIOR ART
Figure 3:
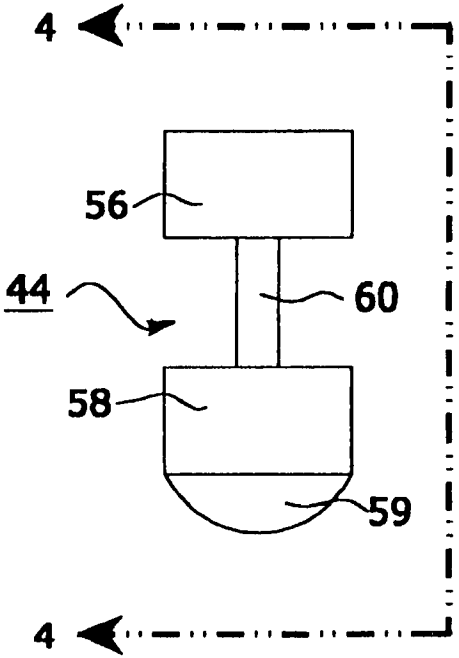
FIG.3 PRIOR ART

FIGS. 3, 4, and 5 illustrate three respective schematic views of a conventional spool for well-known prior art valving in which: FIG. 3 is a side view; FIG. 4 is another side view taken along the plane 4-4 in FIG. 3; and FIG. 5 is a cross-sectional view taken perpendicular to the central axis of the spool along the plane 5-5 of FIG. 4, using dashed lines to indicate the directions of fluid flow past the stem portion of the spool.

Figure 8:
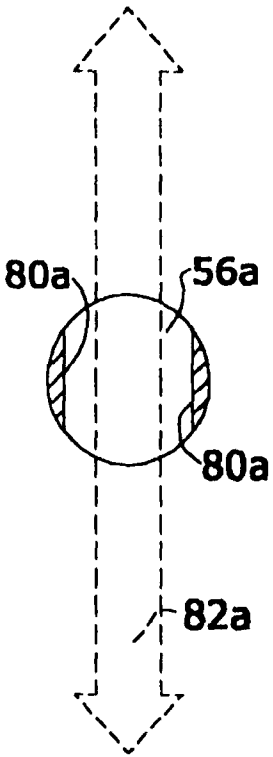
Figure 7:
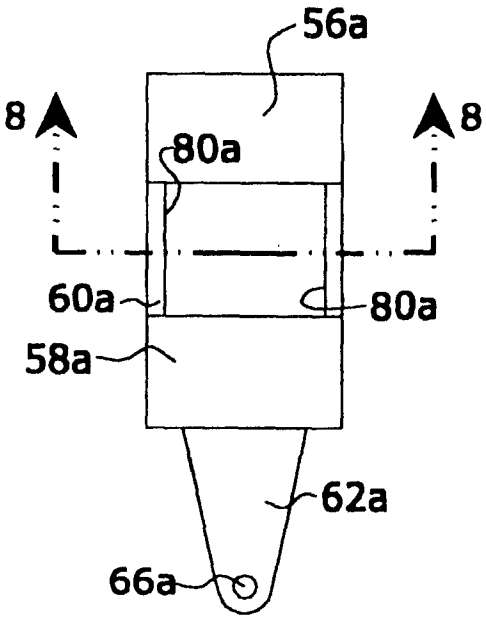
Figure 6:
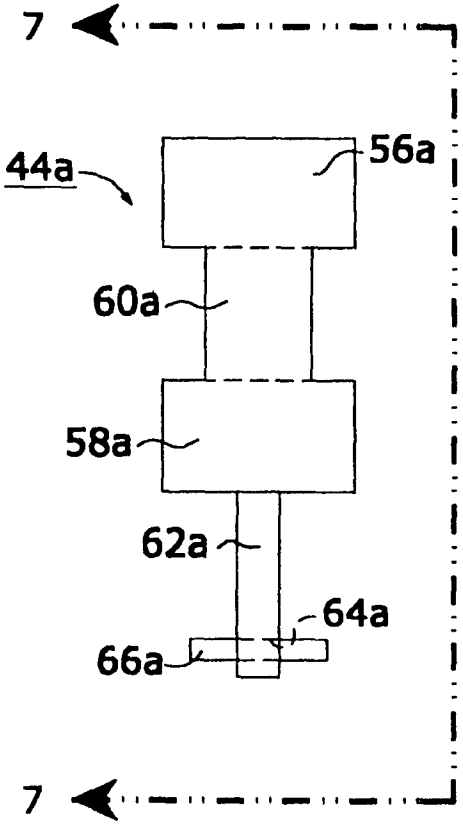

FIGS. 6, 7, and 8 illustrate three respective views of an improved spool according to a first embodiment of the invention in which: FIG. 6 is a schematic side view; FIG. 7 is another side view taken along the plane 7-7 in FIG. 6; and FIG. 8 is a cross-sectional view taken along the plane 8-8 of FIG. 7, using dashed lines to indicate the directions of fluid flow past the stem portion of the spool.

Figure 11:
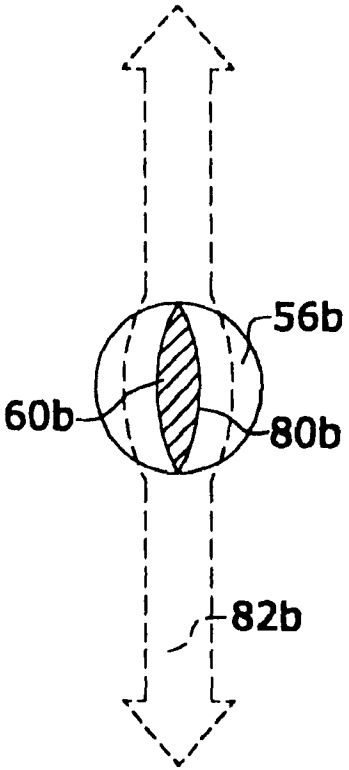
Figure 10:
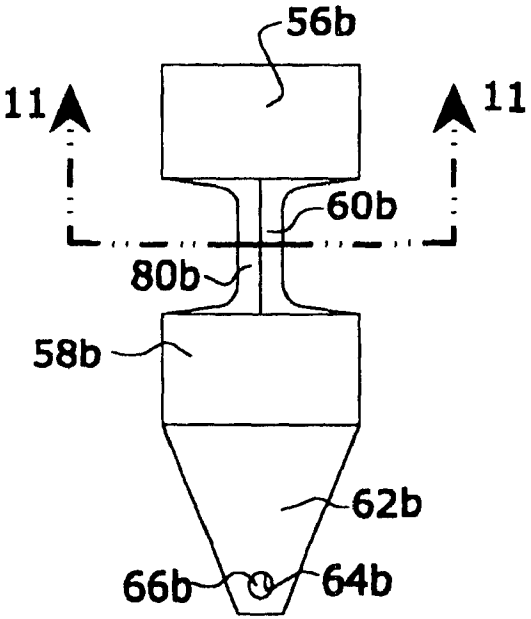
Figure 9:
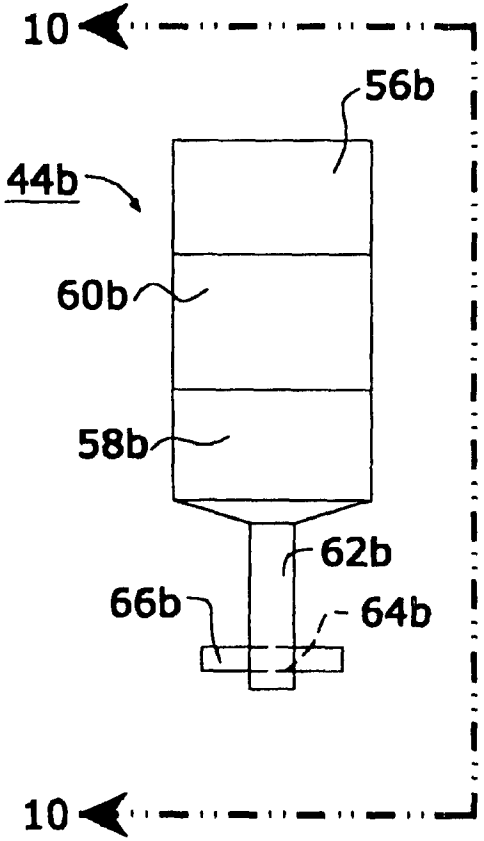

FIGS. 9, 10, and 11 illustrate three respective views of an improved spool according to a second embodiment of the invention in which: FIG. 9 is a schematic side view; FIG. 10 is another side view taken along the plane 10-10 in FIG. 9; and FIG. 11 is a cross-sectional view taken along the plane 11-11 of FIG. 10, using dashed lines to indicate the directions of fluid flow past the stem portion of the spool.

Figure 14:
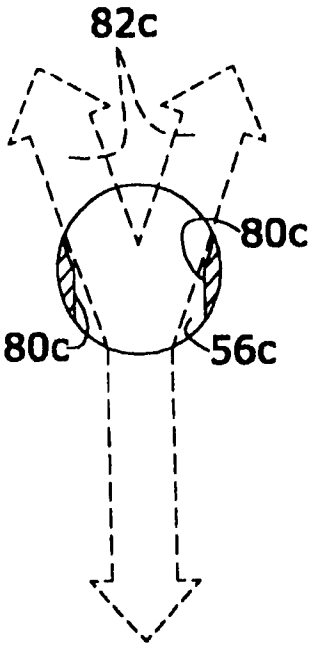
Figure 13:
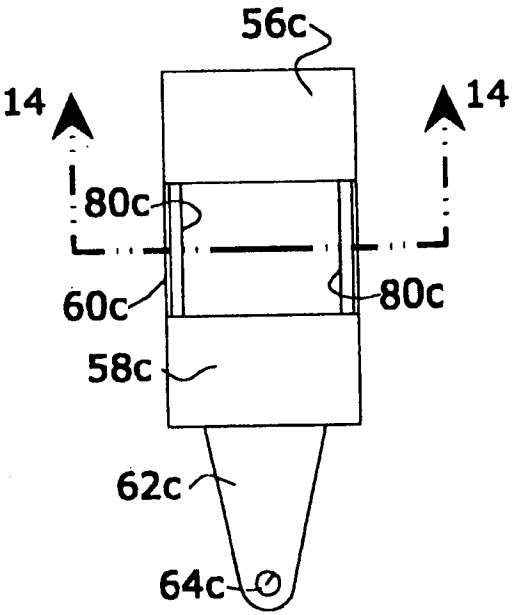
Figure 12:
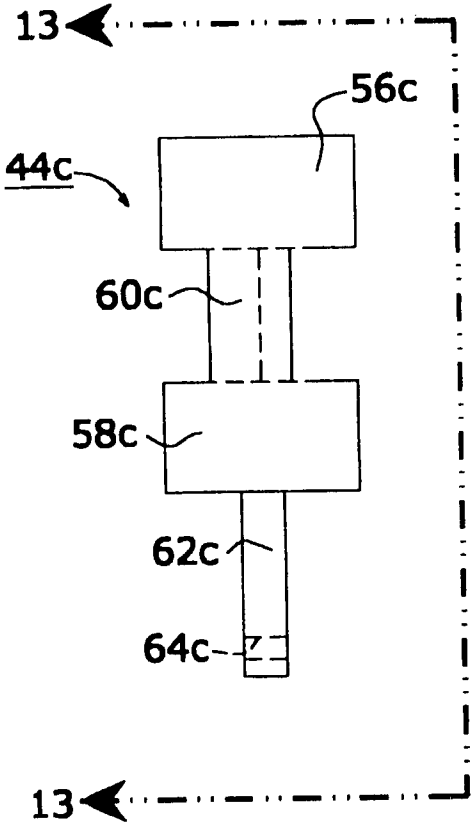

FIGS. 12, 13, and 14 illustrate three respective views of an improved spool according to a third embodiment of the invention in which: FIG. 12 is a schematic side view; FIG. 13 is another side view taken along the plane 13-13 in FIG. 12; and FIG. 14 is a cross-sectional view taken along the plane 14-14 of FIG. 13, using dashed lines to indicate the directions of fluid flow past the stem portion of the spool.

Figure 17:
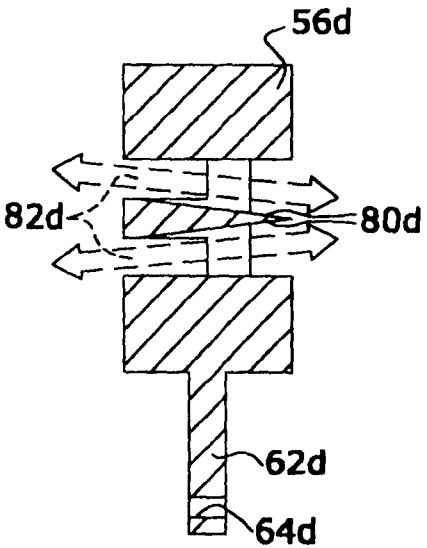
Figure 16:
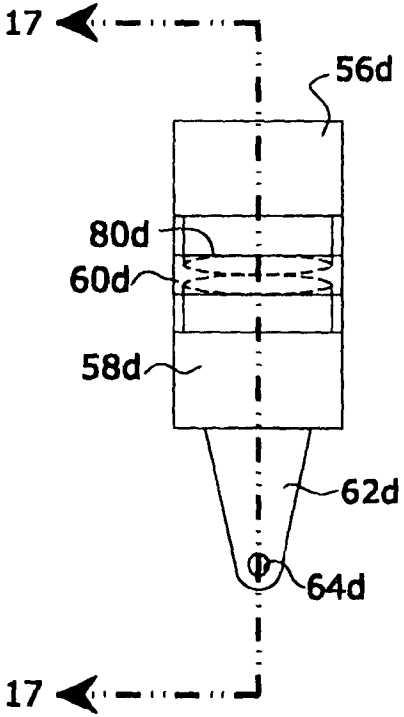
Figure 15:
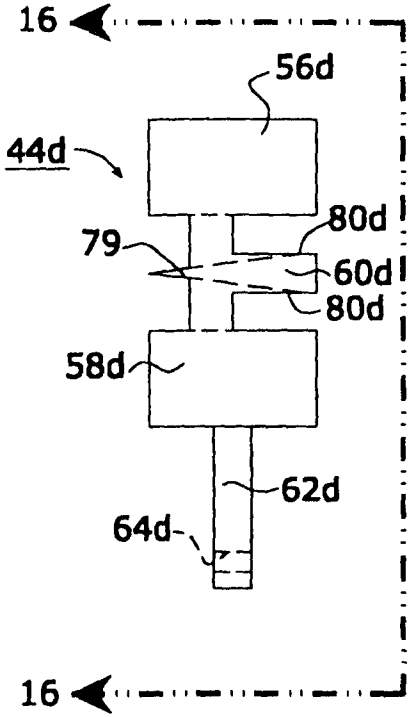

FIGS. 15, 16, and 17 illustrate three respective views of an improved spool according to a fourth embodiment of the invention in which: FIG. 15 is a schematic side view; FIG. 16 is another side view taken along the plane 16-16 in FIG. 15; and FIG. 17 is a cross-sectional view taken in the direction of the central axis of the spool along the plane 17-17 of FIG. 16, using dashed lines to indicate the directions of fluid flow past the stem portion of the spool.

Figure 20:
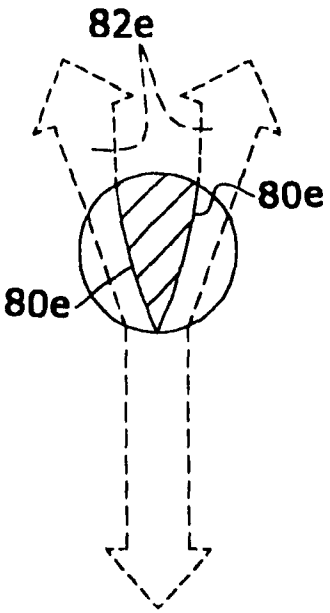
Figure 19:
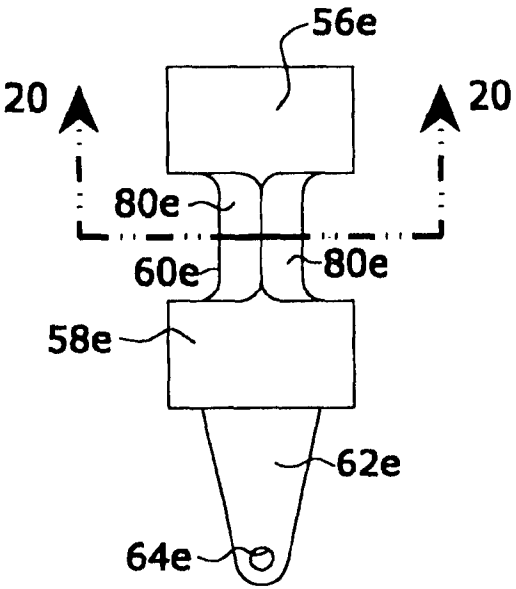
Figure 18:
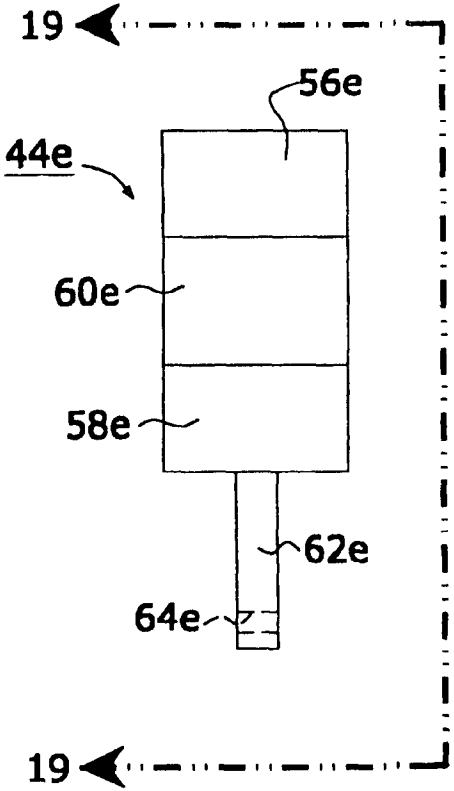

FIGS. 18, 19, and 20 illustrate three respective views of an improved spool according to a fifth embodiment of the invention in which: FIG. 18 is a schematic side view; FIG. 19 is another side view taken along the plane 19-19 in FIG. 18; and FIG. 20 is a cross-sectional view taken along the plane 20-20 of FIG. 19, using dashed lines to indicate the directions of fluid flow past the stem portion of the spool.

Figure 23:
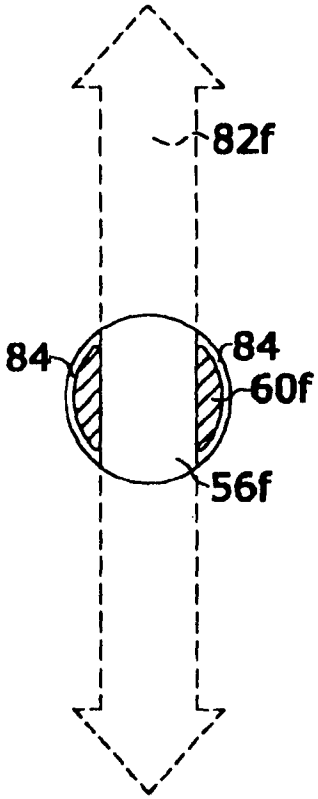
Figure 22:
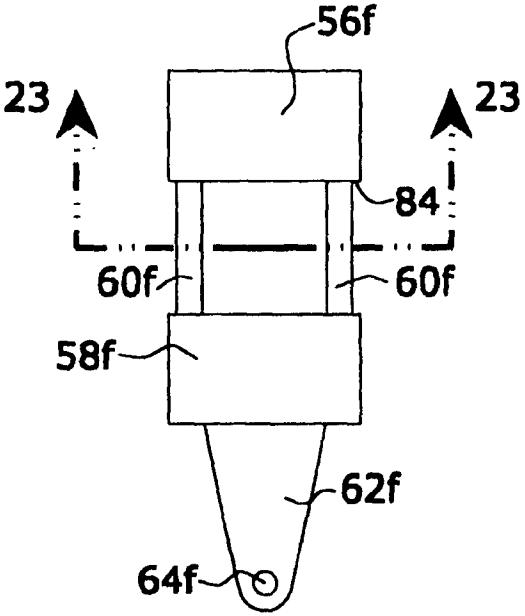
Figure 21:
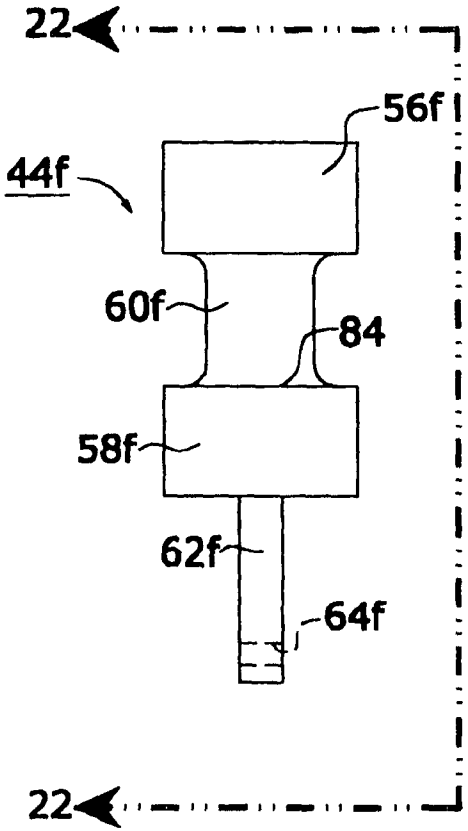

FIGS. 21, 22, and 23 illustrate three respective views of an improved spool according to a sixth embodiment of the invention in which: FIG. 21 is a schematic side view; FIG. 22 is another side view taken along the plane 22-22 in FIG. 21; and FIG. 23 is a cross-sectional view taken along the plane 23-23 of FIG. 22, using dashed lines to indicate the directions of fluid flow past the stem portion of the spool.

DETAILED DESCRIPTION

FIG. 1 shows portions of a hydraulic pump 10 which includes a drive shaft 12 that is rotatable by an exterior power source, e.g., an auto engine, coupled to its right end (neither the right end of shaft 12 nor the exterior power source is shown). Pump 10 has a cylinder block portion 14 in which a plurality of pump cylinders 16 is arranged radially about the axis 42 of drive shaft 12, and the axis of each cylinder 16 is aligned parallel to axis 42. A pump piston 18 is fitted within each pump cylinder 16 and is connected by means of a respective "dog bone" piston rod 20 to a nutating-but-non-rotating wobbler 22 of a swish-plate 24 that also includes a nutating-and-rotating rotor 26. In a manner well known in the art, rotor 26 of swash-plate 24 is pivotally connected to drive shaft 12 for rotation therewith and the angle of swash-plate 24 relative to drive shaft 12 is controlled by means including a link 28. Wobbler 22 is supported within an interior gear 32 of a pair of spherical gears, the exterior gear 34 of the pair being mounted to the internal wall of a swash-plate housing portion 30 that is connected to the right end of cylinder block portion 14 of pump 10.

The reciprocation of pump pistons 18, in response to the rotation of drive shaft 12, moves fluid into and out of pump cylinders 16 through an orifice 17. As each respective piston 18 moves to the right, low pressure fluid entering orifice 17 follows the piston to fill its respective cylinder 16; and, thereafter, as each respective piston 18 is driven back to the left, high pressure fluid is forced out of its respective cylinder 16 through orifice 17. This high speed flow of low and high pressure fluid is controlled by spool valving carried within a valve block 36 connected to the left end of cylinder block 14 by bolts 38.

Valve block 36 is bored with a plurality of valve cylinders 40 arranged about axis 42 of drive shaft 12, and the axis of each valve cylinder 40 extends radially from axis 42. Within each valve cylinder 40, a respective spool 44a is moved axially to sequentially open and close a pair of ports 46, 48 defining respective high and low pressure fluid passageways connecting with corresponding respective passageways 50, 52 in respective spiral manifolds 53 only one shown in hidden lines) formed in an end cap 54, which forms the left end of the housing of pump 10.

Operation of spool valves mounted in valve block 36 will first be generally described using spools according to a first embodiment of the invention. [NOTE: All of the valve spools of the invention share the same basic arrangement of similar elements which are generally identified by the same reference numerals, the elements of each different embodiment being differentiated by the use of letter suffixes (a through f) specific to each embodiment.]

Referring now to FIGS. 2, 6, and 7, each spool 44a includes a pair of port-blocking portions 56a, 58a separated by a stem 60a; and, in preferred embodiments, a tang 62a extends from port-blocking portion 58a. Tang 62a has a guide hole 64a which receives and supports a cam-following roller 66a.

As shown in FIGS. 1 and 2, a pair of mirror-image cam elements 70, 72 are mounted within valve block 36, being fitted over the left end of drive shaft 12. Machined as grooves in the interior faces of cam elements 70, 72 is a pair of respective cam tracks 74, 76, each having at least two parallel surfaces forming the sidewalls of each respective track 74, 76. Cam elements 70, 72 are fixed to rotate with drive shaft 12 and are held in position by a key 78 so that cam track 76 forms the mirror image of cam track 74.

For assembly, after each spool 44a has been fitted within its respective valve cylinder 40, cam element 72 is keyed to shaft 12; and then each respective roller 66a is fitted through the respective guide hole 64 formed in the tang 62 of its respective spool 44. Each cam-following roller 66a is then positioned with one end within cam track 76 of cam element 72. Thereafter, cam element 70 is also keyed to shaft 12 so that the other end of each roller 66a is received within cam track 74 of cam element 70, and cam element 70 is suitably locked in position.

Since, as indicated above, tang 62a is fixed relative to spool 44a, and since cam-following roller 66a is captured within cam tracks 74 and 76 of cam elements 70, 72, spool 44a is prevented from rotation about the axis of its respective valve cylinder 40 at all times during operation. Further, since the position of stem 60a is also fixed relative to the other elements of spool 44a, the orientation of stem portion 60a is similarly prevented from rotation about the axis of its respective valve cylinder 40 at all times during operation.

A primary feature of the invention resides in the shape and orientation of the stem portion of each spool and in the facilitation of the flow and direction of fluid through the passageway formed by each stem portion when the latter is aligned with the port(s) of its respective valve cylinder 40. In this regard, it must be remembered that the axial movements of each spool 44a control sequential and bi-directional flows of fluids, i.e., flows into as well as out of each pump cylinder 16.

The importance of fluid flow facilitation is best appreciated when compared with prior art spools of the type illustrated in FIGS. 3 and 4. In each well-known and widely used prior art spool 44, port-blocking portions 56 and 58 are separated by a stem 60 which is cylindrical in form. The bottom of port-blocking portion 58 is provided with a spherical surface 59 that is designed to ride on the surface of a conventional control cam (e.g., similar to the surface of the inner wall of cam track 74 in FIG. 2). Spherical surface 59 of each such prior art spool 44 serves as a cam follower, being conventionally held in contact with the surface of the control cam by spring bias (not shown).

As indicated in the Background above, each stem 60 of prior art spool 44 is centered on the axis of the spool and has a cylindrical form. Therefore, should spool 44 rotate axially within its respective valve cylinder during valve operation, the relative size and shape of the fluid passageway formed by the stem portion of spool 44 remain constant. As is well known in the art of hydraulics, when a fluid flows past a cylinder at high speed (e.g., the movement of air past a flag pole or the mast of a sailboat), eddies are formed in the moving fluid resulting in a rippling turbulence. The turbulence resulting from the movement of the fluid through the stem passageway of spool 44 is schematically illustrated in FIG. 5 by fluid flow arrow 80 which, as noted above, indicates the bi-directional flow of fluid through each valve. Such turbulent flow decreases valve efficiency, particularly at high speeds and pressures.

The invention herein is directed to the reduction of such turbulence and, thereby, to an increase in the efficiency of high speed/pressure hydraulic pump/motors.

Reducing Turbulent Flow

Referring to a first embodiment of the invention's spool design illustrated in FIGS. 6, 7, and 8, port-blocking portions 56a and 58a of spool 44a are separated by stem portion 60a in which the interiors 80a of two sidewalls define a passageway for the flow of fluid when stem portion 60a is aligned with ports 46 and 48, respectively, of cylinder 40. Since there is no intermediate stem element (e.g., stem 60 of prior art spool 44), fluid is free to move unimpeded and bi-directionally past stem portion 60a of spool 44a, as indicated schematically by fluid flow arrow 82a in FIG. 8. It is important to note that the predetermined position of sidewall interiors 80a relative to ports 46 and 48 is critical to the efficiency of the fluid passageway therethrough; and the constancy of the orientation of sidewall interiors 80a is assured by the orientation mechanism described above, namely, the predetermined and fixed position of tang 62a and roller 66a relative to stem portion 60a.

A second embodiment of the invention's spool design is illustrated in FIGS. 9, 10, and 11. Port-blocking portions 56b and 58b of spool 44b are separated by a central support 60b forming the stem portion which defines a dual passageway for the flow of fluid when central support 60b is aligned with ports 46 and 48, respectively, of cylinder 40. This second embodiment includes a further feature of the invention, namely, the surfaces 80b of central support 60b are provided with a predetermined hydrodynamically shape for facilitating the bidirectional flow of fluid past surfaces 80b and for reducing formation of eddies in the moving fluid. Again, the predetermined position of central support 60b relative to ports 46 and 48 is critical to the efficiency of the fluid passageways formed by this stem section, and the constancy of the orientation of central support 60b is assured by the predetermined and fixed position of tang 62a and roller 66b relative to stem portion 60b.

Enhancing Direction of Flow

As indicated above, spool valves find widespread use in hydraulic machines such as pumps and motors. As is well known in the hydraulic arts, pumps have pistons responsive to the rotation of a drive shaft, the latter being driven by an outside power source. The pistons draw low pressure fluid into the pump's cylinders and then force the fluid out of the cylinders at high pressure. In hydraulic motors, the reverse is true, i.e., high pressure fluid moves the motor's pistons, causing rotation of the motor's drive shaft, and the fluid then exits the cylinders at a lower pressure for return to a closed hydraulic loop shared with a mating hydraulic pump (or, in sonic cases, to a sump). The direction of rotation of the motor's drive shaft is reversed when the flow of the high pressure fluid is reversed in the hydraulic lines serving the motor, etc. In any event, hydraulic fluid enters and exits the cylinders of pump/motors through separate ports, and the direction of flow through these ports can be reversed.

Referring once again to the spool valve arrangement shown at the top left hand portion of the hydraulic machine illustrated in FIG. 1, each valve cylinder 40 includes an orifice 17 that connects with the left end of each pump cylinder 16. Each valve cylinder 40 also includes two other separated ports 46 and 48 that, respectively, connect with fluid passageways 50 and 52 formed in end cap 53 of pump 10. In the particular arrangement illustrated, port 46 is positioned above the level of orifice 17, while port 48 is positioned below the level of orifice 17.

For purposes of this explanation, it is assumed that pump 10 is being operated in a closed fluid loop arrangement with a matching hydraulic motor. Further, it is assumed that high pressure fluid is present in passageway 50 and in the duct connecting with port 46 and that lower pressure return fluid is present in passageway 52 and in the duct connecting with port 48. FIG. 1 shows swash-plate 24 at the maximum tilt angle position at which pump 10 is moving fluid at its maximum flow rate. Assuming that swash-plate 24 has just reached the position shown, spool 44a has just reached its illustrated position in which both ports 46, 48 are blocked. As the pump cycle continues, swash-plate 24 starts moving piston 18 to the right and cam elements 70, 72 move spool 44a downward, connecting fluid return passageway 52 with orifice 17 and permitting fluid to move from port 48 upward into orifice 17 of pump cylinder 16. Return fluid under lower pressure continues to move through orifice 17 and into cylinder 16 until the rotation of swash-plate 24 has allowed the full movement of piston 18 to the right. At this instant, spool 44a has already moved upward and both ports 46, 48 are again blocked. As swash-plate 24 begins to drive piston 18 to the left, the continued upward movement of spool 44a connects orifice 17 with port 46, allowing piston 18 to force high pressure fluid out of cylinder 16 from orifice 17 upward into port 46 and passageway 50.

The following embodiments relate to facilitation of the direction of fluid flow through the stem passageways of the invention's spools.

A third embodiment of the invention, spool 44c, is illustrated in FIGS. 12, 13, and 14; and spool 44c combines key features of the first and second embodiments. Namely, in a design similar to the first embodiment, stem portion 60c comprises a fully-open fluid passageway defined by only two sidewalls. However, in this embodiment, the interior surfaces 80c of the sidewalls are provided with a predetermined hydrodynamically shape selected to facilitate fluid flow to and from a single port (e.g., orifice 17 in FIG. 2 just discussed above) to a pair of ports, (e.g., ports 46 and 48 in FIG. 1) opening, respectively, to the left and right of the single port.

A fourth embodiment, spool 44d, is illustrated in FIGS. 15, 16, and 17. While stem portion 60d also uses a pair of sidewalls to define the limits of the stem passageway, a horizontal divider 79 with hydrodynamically surfaces 80d splits the passageway to direct the flow of fluid as indicated by fluid flow arrows 82d. In this embodiment, it is assumed that a single port (e.g., orifice 17 of FIG. 2) is positioned to the right in FIG. 17. This embodiment is designed to enhance the flow of fluid to and from entrance and exit ports located, respectively, above and below the single port.

FIGS. 18, 19, and 20 illustrate a fifth embodiment, spool 44e, which is a modification of the second embodiment. Namely, the single center support 60e is provided with hydrodynamically surfaces 80e that are designed to direct fluid flow to and from separated ports (e.g., ports 46 and 48 in FIG. 2) which are positioned to the left and right, respectively, of a single port (e.g., orifice 17 in FIG. 2). This directional fluid flow is indicated by arrows 82e in FIG. 20.

Finally, FIGS. 21, 22, and 23 illustrate a sixth embodiment, spool 44f, which is a preferred modification applicable to the first and third embodiments (see FIGS. 7 and 13) wherein the stem portion of the spool comprises a fully-open fluid passageway defined by only two sidewalls. In order to facilitate fluid flow, it may be desirable to reduce the thickness of these sidewalls. However, as the sidewalls become thinner, the passage of high pressure fluid through the stem opening may result in a slight "bowing out" of the sidewalls and the undesirable reduction of clearance between the outside surface of the spool and the interior surface of its respective cylinder.

In this sixth embodiment, a pressure-balancing channel 84 is formed around the entire exterior circumference of stem portion 60f. (NOTE: The depth of channel 84 is shown greatly exaggerated in the illustrations.) Although the width of channel 84 (in FIGS. 21, 22, and 23) is shown as extending along the full vertical height of stem portion 60f, a narrower channel may suffice, since the size of channel 84 need be no larger than that necessary to introduce a balancing pressure (between the outside of each sidewall and the interior surface of the cylinder in which spool 44f is mounted) sufficient to prevent distortion of the sidewalls.

As was explained above in regard to the first and third embodiments, spool 44f has no intermediate stem element (e.g., stem 60 of prior art spool 44), and fluid is free to move unimpeded and bi-directionally past stem portion 60f of spool 44f, as indicated schematically by fluid flow arrow 82f in FIG. 23. However, it should also be noted that no flow is indicated through channels 84 formed on the outer circumference of stem portion 60f, because the depth of channels 84 (shown greatly exaggerated), while appropriate for introducing the desired balancing pressure, is not large enough to permit any appreciable flow of fluid therethrough.

In the four latter embodiments, the orientation of the fluid passageways through the stem portions of the spools is once again critical. As explained in relation to the first and second embodiments, this critical orientation is maintained by a mechanism that prevents rotation of the individual spools 44a-f about the axis of their respective valve cylinders 40. Such an orientation mechanism might include some form of keyway arrangement using a key and slot/slide combination shared by each valve cylinder and spool. However, once again, the preferred orientation mechanism comprises a positively driven cam follower captured in a cam track and positioned in a fixed orientation relative to each spool as fully described above.

The invention as described above increases pump efficiency by (a) positively driving each spool, by (b) facilitating the direction of fluid flow past the stem portion of each spool, and by (c) using spool stem design to reduce fluid turbulence. The reduction of fluid turbulence in the valving system of hydraulic pump/motors not only increases machine efficiency but also significantly reduces the machine noise that accompanies all high speed movement of fluid.

We claim:

1. In spool valve apparatus having a plurality of [respective] valves operated sequentially by the rotation of a drive shaft, each [spool] *said* valve comprising (a) a cylinder having at least a first *fluid* port defining a first fluid passage, and (b) a spool having a stem portion and at least one port-blocking portion, said spool being movable axially within the cylinder between first and second positions so that, when said spool is in said first position, [said] fluids are permitted to move past said stem portion and through said first fluid passage and, when said spool is in said second position, said first fluid passage is blocked, the improvement comprising:

a cam track rotated by said drive shaft and having at least two parallel surfaces; and a plurality of cam followers, each cam follower being associated with, and aligned in a predetermined position relative to, a respective one of said spools, and each cam follower being captured between said parallel surfaces of said cam track for relative moving engagement therewith for controlling said axial motion of each respective spool and said sequential operation of said respective spool valves in response to the rotation of said drive shaft;

and wherein:

said stem portion of each respective spool defines a passageway formed by [one of (a) no sidewalls with a central support comprising a non-cylindrical curved surface shaped hydrodynamically, and (b)] a pair of sidewalls with said passageway formed therebetween, said [central support and said] sidewalls *having interior surfaces shaped hydrodynamically, said sidewalls* being positioned in a predetermined orientation relative to said respective first fluid port of said cylinder to facilitate the flow of fluids past said stem portion and through said first fluid port when said stem portion is aligned therewith.

2. The spool valve improvement of claim 1 wherein:

said cylinder comprises a second *fluid* port spaced from said first *fluid* port and defining a second fluid passage; and when said spool is in said first position and [said] fluids are permitted to move past said stem portion and through said first *fluid* port, said second fluid port is blocked;

when said spool is in said second position, said first fluid passage is blocked and fluids are permitted to move past said stem and through said second fluid port; and said predetermined orientation [of said central support and] of said passageway between said sidewalls of said stem portion is positioned to facilitate the flow of fluids (a) past said stem portion and through said first fluid passage when said stem portion is aligned with said first fluid port and (b) past said stem portion and through said second fluid passage when said stem portion is aligned with said second fluid port.

3. The spool valve improvement of claim 2 wherein said pair of sidewalls of said stem portion has interior surfaces that form said passageway therebetween, and each said interior surface is shaped hydrodynamically to facilitate the flow of fluids through said stem portion and to direct the flow of fluids to and from said respective first and second fluid ports when said stem portion is aligned therewith.

4. The spool valve improvement of claim 2 wherein said stem portion having a pair of sidewalls further comprises a pair of passageways formed between said sidewalls, each said passageway being oriented to direct fluid to and from a respective one of said [cylinder] *fluid* ports when said stem portion is aligned therewith.

[5. The spool valve improvement of claim 2 wherein said non-cylindrical central support forms a pair of passageways, each said passageway being oriented to direct fluid to and from a respective one of said cylinder ports when said stem portion is aligned therewith.]

6. The spool valve improvement of claim 2 wherein said plurality of cylinders is positioned equidistant from each other along axes extending radially from a central axis.

7. The spool valve improvement of claim [1] *8* wherein said predetermined position of each said cam follower relative to its respective spool prevents rotation of each spool about the axis of its respective cylinder when said roller is in rolling engagement with said cam track and, thereby, maintains said predetermined orientation of said [central support and said] sidewalls of said stem portion to facilitate said fluid flow.

8. The spool valve improvement of claim [7] *1* wherein each said cam follower comprises a roller captured for rolling engagement with said cam track.

9. The spool valve improvement of claim 8 wherein each said spool has a tang through which said respective roller is received and supported in said predetermined position to permit said rolling engagement with said parallel surfaces of said cam track.

10. The spool valve improvement of claim 8 wherein said parallel surfaces of said cam track are divided into two aligned mirror-image portions, and wherein each said roller is in rolling engagement with both said aligned mirror-image portions at all times.

11. The spool valve improvement of claim 1 wherein each said sidewall of said stem portion has an exterior surface and further comprises a pressure-balancing channel formed therein.

12. A spool for a valve for controlling the flow of fluids, said valve having a body including *a cylinder having* a cavity for receiving said spool, said cavity having an axis and at least [one] *a first fluid* port defining a first fluid passage, and said spool comprising:

a first port-blocking portion and a stem positioned around a central axis for alignment with the axis of said cavity;

said spool being movable axially within said cavity between first and second positions so that, when said spool is in said first position, said first fluid passage is blocked by said first port-blocking portion, and, when said spool is in said second position, fluids are permitted to move past said stem and through said first fluid passage; and said stem defining a stem passageway formed by [one of (a) no sidewalls with a central support, and (b)] a pair of sidewalls with said stem passageway formed therebetween, [said central support and] said sidewalls, when viewed in cross section perpendicular to said central axis, having non-circular curved surfaces shaped aerodynamically, and [said central support and] said sidewalls also being positioned relative to said respective first fluid port of said cylinder to permit the flow of fluids through said stem passageway and through said first fluid port when said stem portion is aligned therewith.

13. The spool of claim 12 further comprising an orientation mechanism for positioning said stem passageway formed by said sidewalls [and by said central support] in a predetermined orientation relative to said first fluid passage so that said fluid flow through said first *fluid* port is facilitated at all times when said stem is aligned therewith.

14. The spool according to claim 13 wherein said spool valve for controlling the flow of fluids is incorporated in a machine having, a control cam surface rotated by a drive shaft, said control cam having at least two parallel surfaces, and wherein:

said orientation mechanism comprises a cam follower aligned in a predetermined position relative to said spool, said cam follower being captured between said parallel surfaces of said control cam for relative moving engagement therewith for controlling axial motion of said spool.

15. The spool according to claim 14 wherein said cam follower is a roller.

16. The spool according to claim 12 wherein each said sidewall of said stem portion has an exterior surface and further comprises a pressure-balancing channel formed therein.

17. The spool according to claim 12 wherein said cavity in said valve body includes a further port defining a second fluid passage, and said spool further comprises:

a second port-blocking portion separated from said first port-blocking portion by said stem and, when said spool is in said first position, said first port-blocking portion of said spool blocks said first fluid passage while fluids are permitted to move through said stem passageway and through said second fluid passage, and when said spool is in said second position, said second port-blocking portion of said spool blocks said second fluid passage while fluids are permitted to move through said stem passageway and through said first fluid passage; and an orientation mechanism for positioning said stem passageway in a predetermined orientation relative to both said first fluid passage and said second fluid passage so that fluid flow through said stem passageway is facilitated at all times when said stem is aligned, respectively, with said first and second fluid passages.

*18. In spool valve apparatus having a plurality of valves operated sequentially by the rotation of a drive shaft, each said valve comprising (a) a cylinder having at least a first fluid port defining a first fluid passage, and (b) a spool having a stem portion and at least one port-blocking portion, said spool being movable axially within the cylinder between first and second positions so that, when said spool is in said first*

*position, fluids are permitted to move past said stem portion and through said first fluid passage and, when said spool is in said second position, said first fluid passage is blocked, the improvement comprising:*

*a cam track rotated by said drive shaft and having at least two parallel surfaces; and*

*a plurality of cam followers, each cam follower being associated with, and aligned in a predetermined position relative to, a respective one of said spools, and each cam follower being captured between said parallel surfaces of said cam track for relative moving engagement therewith for controlling said axial motion of each respective spool and said sequential operation of said respective spool valves in response to the rotation of said drive shaft;*

*wherein:*

*said stem portion of each respective spool defines a passageway formed by no sidewalls with a central support comprising a non-cylindrical curved surface shaped hydrodynamically, said central support being positioned in a predetermined orientation relative to said respective first fluid port of said cylinder to facilitate the flow of fluids past said stem portion and through said first fluid port when said stem portion is aligned therewith;*

*said cylinder comprises a second fluid port spaced from said first fluid port and defining a second fluid passage;*

*when said spool is in said first position and fluids are permitted to move past said stem portion and through said first fluid port, said second fluid port is blocked;*

*when said spool is in said second position, said first fluid passage is blocked and fluids are permitted to move past said stem and through said second fluid port;*

*said predetermined orientation of said central support is positioned to facilitate the flow of fluids (a) past said stem portion and through said first fluid passage when said stem portion is aligned with said first fluid port and (b) past said stem portion and through said second fluid passage when said stem portion is aligned with said second fluid port;*

*wherein said central support forms a pair of passageways, each said passageway being oriented to direct fluid to and from a respective one of said fluid ports when said stem portion is aligned therewith.*

* * * * *